United States Patent

[11] 3,596,643

| [72] | Inventor | Paul H. Schweitzer<br>State College, Pa. |
|---|---|---|
| [21] | Appl. No. | 752,064 |
| [22] | Filed | Aug. 12, 1968 |
| [45] | Patented | Aug. 3, 1971 |
| [73] | Assignee | Optimizer Control Corporation |

[54] AUTOMATIC OPTIMUM-POWER-SEEKING CONTROL SYSTEM
19 Claims, 8 Drawing Figs.

[52] U.S. Cl.............................................. 123/117 A,
60/39.28, 60/105, 91/275, 123/102, 318/561
[51] Int. Cl...................................................... F02p 5/14,
G05b 13/00, G05d 17/00
[50] Field of Search............................................ 123/117,
117.1, 102; 60/105, 39.28, 243; 137/36; 253/39 N;
91/275; 318/20.050, 20.080, 561, 20.525; 158/36.4 A
415/13, 30

[56] References Cited
UNITED STATES PATENTS

| 2,628,606 | 2/1953 | Draper | 123/102 |
|---|---|---|---|
| 2,842,108 | 7/1958 | Sanders | 123/102 |
| 3,034,569 | 5/1962 | Eastman | 60/243 |
| 3,190,301 | 6/1965 | Hackman | 137/92 |
| 2,750,741 | 6/1956 | Leeper | 60/39.28 |
| 2,923,129 | 2/1960 | Schwede | 60/39.28 |
| 3,142,967 | 8/1964 | Schweitzer | 60/105 |
| 3,272,191 | 9/1966 | Walker | 123/117.1 |
| 3,392,739 | 7/1968 | Taplin | 60/39.28 |

FOREIGN PATENTS

| 1,125,230 | 3/1962 | Germany | 123/117.1 |

*Primary Examiner*—Douglas Hart
*Attorneys*—Nelson E. Kimmelman and Maleson, Kimmelman and Ratner ABSTRACT: The power output of a power-producing machine may be optimized by continuously varying the fluid pressure applied to an actuator which oscillates the setting of an adjustable machine variable about a zero position. The resultant changes of the output power are sensed. Signals are produced which correspond to these changes and to the direction of instantaneous position change of the setting and the fluid pressure is controlled in accordance with these signals in a manner to adjust the zero position about which the setting is being oscillated.

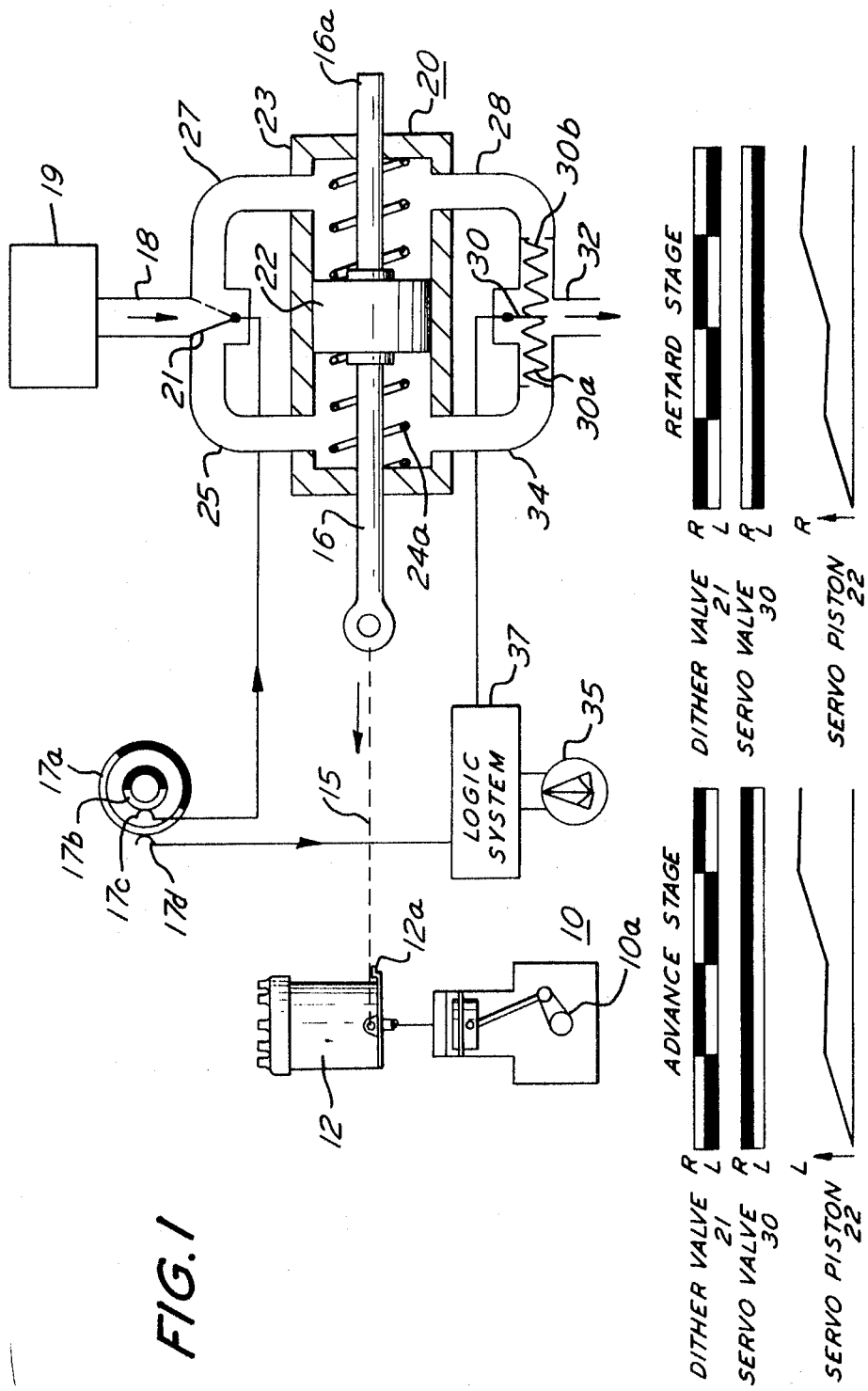
INVENTOR
PAUL H. SCHWEITZER

INVENTOR
PAUL H. SCHWEITZER
BY
Maleson, Kummelman & Ratner
ATTORNEYS.

AUTOMATIC OPTIMUM-POWER-SEEKING CONTROL SYSTEM

BACKGROUND OF THE INVENTION

1. Field of the Invention

This invention pertains to the field of art of power-producing machines having an automatic optimum-power-seeking control system.

2. Prior Art

For almost every power-producing machine such as internal combustion engines, turbines, electric motors, etc. there is an optimum setting for adjustable machine variables. These variables may be spark timing, injection timing, value timing, air-fuel ration, compression ratio, field current, etc. At the optimum setting of the respective variable, the machine delivers its maximum or best power with respect to that variable. If the setting of the machine variable is other than optimum, the machine power output can be increased by changing the setting from an initial position until maximum power output is obtained.

An automatic control system which finds the foregoing optimum setting is described in paper No. 660,022 published by the Society of Automotive Engineers dated Jan. 10—14, 1966 by P. H. Schweitzer et al., Control System to Optimize Engine Power and in U.S. Pat. No. 3,142,967. The automatic control system is effective to find the optimum setting and to correct it continuously as operating conditions change such as speed, load, fuel, temperature, etc. Specifically, the control system continuously oscillates or "dithers" the setting of a selected machine variable within narrow preset limits. The resultant minute accelerations or decelerations of the machine are sensed. The control system compares the sensed signals and the dither signals and if the machine accelerated at the time when the selected variable is increased a command signal is applied to a servomotor to increase the zero position of the variable. On the other hand, if the machine accelerated at the time when the variable is decreased a command signal is applied to the servomotor to decrease the zero position of the variable. At every step the control system reduces the difference between the optimum setting and actual setting. Since this takes place several times per second, the optimum setting of the variable is quickly achieved.

In a particular example the power producing machine may be an internal combustion spark ignition engine in which the adjustable machine variable is the spark timing of the engine. The automatic control system may include an electric servomotor for adjusting the zero position of the spark timing. In addition to electric servomotors, hydraulic or pneumatic servomotors may be used for the adjustment. When using hydraulic or pneumatic servomotors, it is then advantageous to use liquid or air for dithering the adjustment.

SUMMARY OF THE INVENTION

The power output of a power-producing machine may be optimized by continuously varying the fluid pressure applied to an actuator which oscillates the setting of an adjustable machine variable about a zero position. The resultant positive and negative changes of the output power are sensed and first signals are produced which correspond to these changes. Second signals are produced corresponding to the instantaneous change of position of the setting, which is controlled by the fluid flow to the actuator. The first and second signals are compared and the fluid pressure is controlled in accordance with these signals in a manner to adjust the zero position about which the setting is being oscillated. In this way the power output of the machine is optimized relative to the adjustable machine variable.

BRIEF DESCRIPTION OF THE DRAWINGS

FIG. 1 illustrates in part block diagram form an automatic control system according to the invention.

FIGS. 2A–B show graphs useful in explaining the operation of FIG. 1.

Referring now to FIG. 1 there is shown an automatic control system for an internal combustion spark ignition engine 10 in which the adjustable machine variable is the spark timing of the engine. Engine 10 includes a distributor housing 12 having a distributor disc 12a which may be dithered alternately to the left and to the right by means of a linkage 15 connected to a piston rod 16a of actuator 20. In this manner, distributor disc 12 is oscillated a small amount, say 3° clockwise and 3° counterclockwise at a dither frequency of say 100 times per minute. When linkage 15 is moved to the left disc 12a is turned clockwise and the spark timing is advanced. When linkage 15 is moved to the right the disc is moved counterclockwise and the spark timing is retarded. Accordingly, the spark timing is alternately advanced and retarded at the dither frequency and the engine responds to these fluctuations by alternate accelerations and decelerations at the dither frequency.

Figure 3:
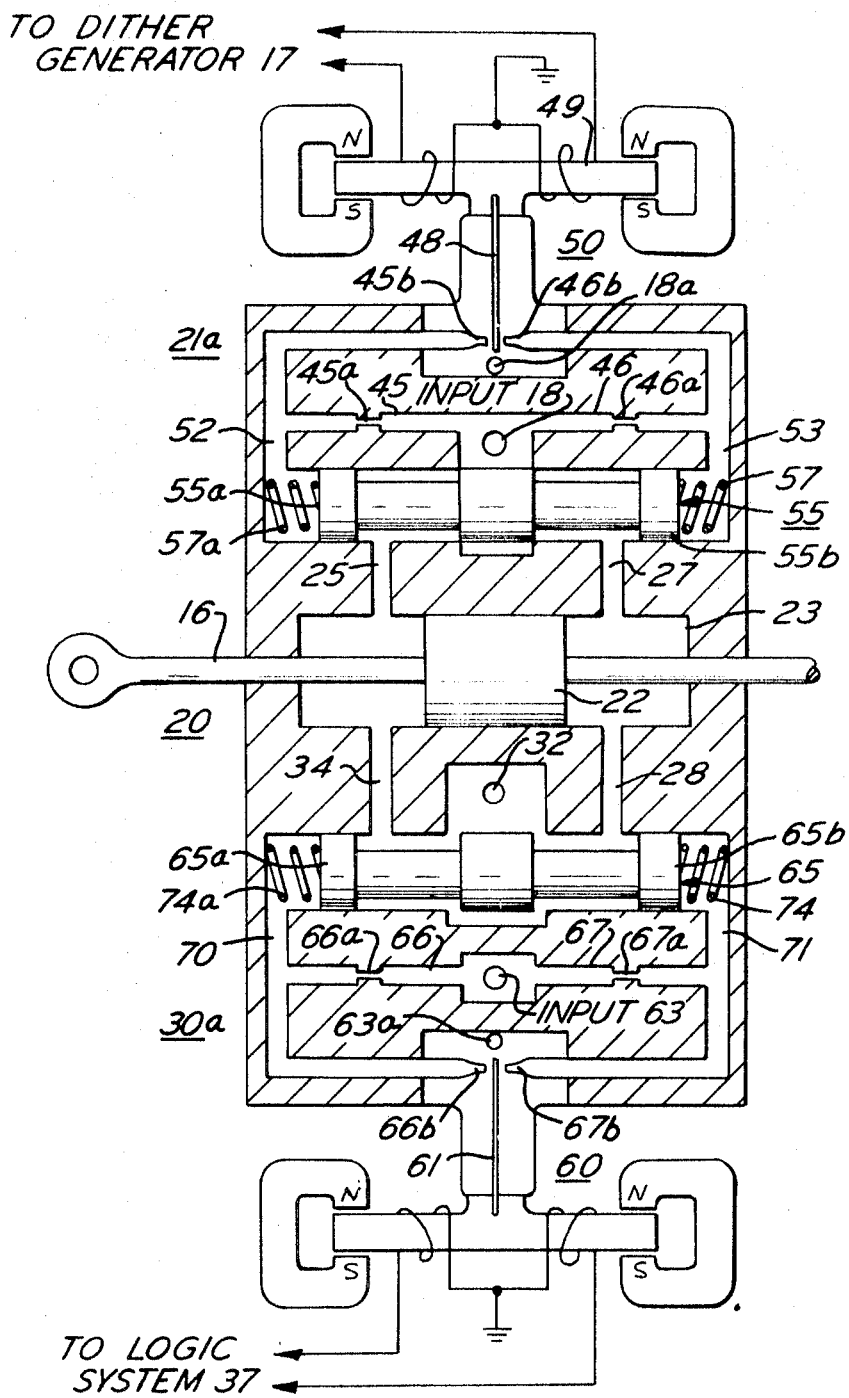
FIG. 3 illustrates a form of the invention in which electrohydraulic flapper-nozzle type of valves are used for the valves in FIG. 1.

Actuator 20 comprises piston 22 disposed within a cylinder 23 with piston rods 16 and 16a respectively connected to the left and right face of the piston. Piston 22 may be balanced to a rest position by opposing springs 24 and 24a. A supply 19 of hydraulic fluid under pressure is applied by way of a line 18 to a dither valve 21. A line 27 is connected between the right side of valve 21 and the right end or rear section of cylinder 23. A line 25 is connected between the left side of valve 21 and the left end or front section of cylinder 23. Hydraulic fluid exits from the right side of cylinder 23 by way of an output line 28 and through a servovalve 30 to a tank return line or drain 32. Similarly, hydraulic fluid exits from the left side of cylinder 23 by way of an exit line 34 and through servovalve 30 to the drain 32.

As will later be described in more detail, dither valve 21 is oscillated between a closed left (open right) position illustrated by the solid line and a closed right (open left) position illustrated by the dotted line in response to signals from a dither generator 17. The resultant minute accelerations and decelerations of a rotating crankshaft 10a of engine 10, which provides the power output of the engine, are sensed by a Celsig 35. Celsig stands for acceleration and deceleration signaler. Celsig 35 provides signals according to shaft accelerations or decelerations and applies these signals to a logic system 37. Signals from the dither generator 17 are also applied to logic system 37 which sends command signals to control the operation of servovalve 30. If the logic system determines that a positive acceleration coincides in time with a dither signal from generator 17 indicating an "advance," a command signal is applied to servovalve 30 which is effective to advance the zero position about which piston 22 oscillates. In this manner the zero position of the setting of the variable is advanced or increased. On the other hand, if logic system 37 determines that a positive acceleration coincides in time with a retard signal a command signal is produced to retard the zero position. Logic system 37 also operates on deceleration signals from Celsig 35 to advance the zero position of the setting when a deceleration coincides with a retard signal from generator 16. In addition, the setting is retarded when deceleration coincides with an advance signal from generator 16. The above process continues until a dither advance and a dither retard no longer produce substantial accelerations or decelerations of the engine crankshaft. However, the process begins again when operating conditions alter the optimal setting of the spark timing.

Celsig 35 may be either a seismic or pulse-counting type sensing minute velocity changes, or it may be a torque-sensing type sensing minute torque variations. In this manner changes in the power are sensed. Dither generator 17 may comprise a pair of rotating contact rings 17a and 17b. Each contact ring comprises a pair of half-rings with the shaded conductive half conducting current to brushes riding on the rings, while the other half is of insulating material. The contact rings are secured to a shaft (not shown) which is rotated at the dither frequency. Thus, rectangular waves are produced on contact brushes 17c and 17d connected to valve 21 and system 37 respectively. In order to compensate for electrical, mechanical and hydraulic delays the half-rings of contact ring 17a are offset from the half-rings of 17b. In this way the dither signals applied to the logic system are retarded in phase relative to the dither signals applied to valve 21.

An electronic rectangular wave or sine wave pulse generator can take the place of the rotating rings and brushes.

The operation of dither valve 21 and servovalve 30 to control actuator 20 will now be described in more detail. In the embodiment shown in FIG. 1, the dither valve 21 oscillates between full open position right (left line 25 closed and right line 27 open) and full open position left (line 27 closed and line 25 open). Servovalve 30 under control of logic signals from logic system 37 has three positions viz neutral, closed right and closed left. In the neutral position, servovalve 30 allows unrestricted outflow from both the left and right sides of cylinder 23 through lines 34 and 28 respectively. With servovalve closed right the outflow from the right-hand side of cylinder 23 is restricted though ample leakage through line 28 is provided. With servovalve 30 closed left the outflow from the left side of cylinder 23 is restricted though ample leakage is provided.

The oscillation or dither of piston 22 and rod 16 will be best understood when it is assumed that servovalve 30 is in a neutral position held there by a pair of balance springs 30a and 30b. As dither valve 21 oscillates at dither frequency, the fluid pressure applied the left and right ends of cylinder 23 oscillates slightly thereby causing piston 22 to oscillate slightly at the dither frequency about the zero position.

However, when logic system 37 sends a close right command to servovalve 30, the fluid pressure in the right end of cylinder 23 increases when dither valve 21 is closed left. At this time the left end of cylinder 23 is being drained and piston 22 moves to the left a distance, the relative value of which is shown in FIG. 2A. While the servovalve is maintained closed right and the dither valve is closed right, piston 22 moves to the right a small amount. The foregoing operation continues with the servovalve closed right and the dither valve oscillating at the dither frequency. In this manner the zero position of piston 22 moves to the left as shown in FIG. 2A for an advance in the setting of the spark timing. This goes on as long as the servovalve is closed right which occurs every time when advance motion and acceleration coincide.

In the other position of servovalve 30 viz closed left, the fluid pressure in the left end of the cylinder 23 increases when dither valve 21 is closed right. At this time the right end of cylinder 23 is being drained and piston 22 moves to the right a distance the relative value of which is shown in FIG. 2B. With servovalve 30 maintained closed left and the dither valve closed left, piston 22 moves to the left a small amount. The foregoing operation continues as the dither valve oscillates and thus the zero position of piston 22 moves to the right as shown in FIG. 2B for a retard in the setting of the spark timing. During optimal setting the piston and control actuator perform only small oscillations and servovalve 30 remains at substantially neutral position.

It will now be understood that logic system 37 provides control of servovalve 30 for advance and retard of the spark setting for the following conditions.

| Dither Valve 21 | Celsig 35 Output | Servovalve 30 | Advance or Retard Zero Setting |
|---|---|---|---|
| open right − | acceleration | open left | advance |
| open left + | acceleration | open right | retard |
| open right + | deceleration | open right | retard |
| open left + | deceleration | open left | advance |
| either | insignificant | neutral | 0 |

It will be understood that the dither frequencies produced by dither generator 17 may be other than at the 100 cycles per minute such as from 50 to 500 cycles per minute. In addition, dither valve 21 may be oscillated mechanically by means of a lever or rod or hydraulically with a rotary valve, poppet valve, etc. Further, the dither valve may be oscillated by electrical means such as by solenoids, torque motors, etc. Although the engine variable has been illustrated to be spark timing, it will be understood that any other variable may be used which influences the engine output such as injection timing, valve timing, throttling, etc. The amplitude of oscillation may be as small as a fraction of a degree.

The dither valve and servovalve of FIG. 1 may be of the electrohydraulic flapper-nozzle type as illustrated in FIG. 3 and shown and described in Walters, R. Hydraulic and Electrohydraulic Servo Systems, The Chemical Rubber Co., 1967, p. 105. Referring first to valve 21a, hydraulic fluid at supply pressure is applied by way of input 18 to two parallel branches 45 and 46 each comprising a fixed orifice 45a and 46a respectively and a nozzle 45b and 46b respectively. A pivoted flapper 48 is disposed between nozzles 45b and 46b so that these nozzles operate as variable orifices. Fluid exit is at restricted drainage hole 18a.

Flapper 48 is connected to an armature 49 of a torque motor 50 and is actuated in accordance with signals from dither generator 17. These signals produce a torque in motor 50 which is balanced by the reaction forces acting on flapper 48 which results in a small angular displacement of the flapper. Accordingly, there is an increase in the restriction on one of the nozzles and a decrease on the other thereby providing differential metering of the fluid flow through parallel branches 45 and 46. A control fluid pressure is tapped off at passageway 52 which is between fixed orifice 45a and variable orifice 45b and is applied to the left face 55a of a dither pilot piston of valve spool 55. Similarly another control pressure is tapped off at passageway 53 which is between fixed orifice 46a and variable orifice 46b and is applied to the right face 55b of piston 55. Piston 55 is balanced to a zero position by two opposing springs 57 and 57a. In this manner a displacement of piston 55 is produced which corresponds to the differential control pressure supplied.

Piston 55 is a conventional spool valve having substantially low leakage. In operation, with flapper 48 displaced to the left, piston 55 moves to the right and fluid pressure is applied from input 18 through passageway 25 to the left face of piston 22. On the other hand, with flapper 48 displaced to the right, piston 55 moves to the left and fluid pressure is applied through passageway 27 to the right face of piston 22.

Flapper-nozzle servovalve 30a operates in manner similar to that of valve 21a and comprises a torque motor 60 having a flapper 61 and the servo pilot piston 65. Fluid pressure is applied from an input 63 to two parallel branches 66 and 67 each comprising a fixed orifice 66a and 67a respectively and a nozzle 66b and 67b respectively. Fluid exit is at restricted drainage hole 63a. A signal supplied by logic system 37 to the winding of torque motor 60 produces a torque which is balanced by the reaction forces acting on flapper 61. A resultant control pressure is tapped off at passageway 70 between fixed orifice 66a and nozzle 66b and a control pressure is tapped off at passageway 71 between fixed orifice 67a and nozzle 67b. These control pressures 70 and 71 are respectively applied to the left face 65a and the right face 65b of piston 65 which is balanced by two opposing springs 74 and 74a. In this manner a left and a right displacement of flapper 61 produces a right and a left displacement respectively of piston 65. Piston 65 controls the exit of fluid flow from cylinder 23 through passageways 34 and 28 to a drain 32. It will be seen that piston 65 provides substantial leakage as compared with piston 55.

In the control systems of FIGS. 1 and 3 a pair of electrohydraulic valves are required. For example, in FIG. 1 valve 21 controls the input of hydraulic fluid to actuator 20 while valve 30 controls the exit of the hydraulic fluid. In the control system of FIG. 4 one of the electrohydraulic valves is eliminated while maintaining the same resultant operation. Specifically, the control system of FIG. 4 comprises an actuator 20 having a single electrohydraulic valve 80 connected to input passageways 27 and 25 of the actuator. As pilot piston 82 of valve 80 is displaced to the right, fluid under pressure is applied by way of an input 84 through chamber 85 of valve 80 and then through passageway 25 to the left face of piston 22. On the other hand, with pilot piston 82 displaced to the left, fluid under pressure is applied through chamber 85 and passageway 27 to the right face of piston 22. Hydraulic fluid exists from the right end of cylinder 23 by way of a restricted output line 28a to a drain 32a and fluid exits from the left end of cylinder 23 by way of restricted output line 34a to the drain.

The displacement of valve 80 is in accordance with a selected one of waveforms $a$, $b$ or $c$ from a wave generator 88. The selected waveform is applied to solenoid winding 87a and 87b of valve 80. The positive going portion of each pulse waveform $a$, $b$ and $c$ is effective to displace valve 82 and piston 22 to the right and the negative going portion is effective to displace the valve and piston to the left. The generation of these waveforms will later be described in detail. The selection of waveform $a$, $b$ or $c$ is determined by a logic system 90 having applied thereto sensing signals from Celsig 35 and an advance indicator 92. Indicator 92 may consist of a magnet 93 secured to piston rod 16 and a fixed winding 95. When rod 16 moves to the right in advance direction a positive current is generated in winding 95 and when rod 16 moves to the left in a retard direction a negative current is generated.

In operation a selected one of the three waveforms is applied to windings 87a and 87b, and pistons 82 and 22 continuously oscillate at a dither frequency of $n$ pulses per minute. When the engine calls for an advance in the zero position of the setting of the spark timing it will accelerate during advance periods and decelerate during retard periods. Accordingly when rod 16 moves in the advance direction a positive current in generated in winding 95 which is applied to logic system 90. At the same time Celsig 35 produces a signal indicating an acceleration. Thus logic system 90 selects waveform $a$ in which the positive-going portion (advance) of the waveform comprises three-quarters of a pulse interval and the negative-going portion (retard) comprises only one-quarter of the interval. For example, piston 16 may move in an advance direction for three-quarters of a second and in a retard direction one-quarter of a second with the net effect being an advance of the zero setting. In this manner the spark setting is dithered at a dither frequency of $n$ pulses per minute with the zero position moving to the right.

This sequence repeats continuously until rod 16 advances so far that the engine no longer calls for an advance. Specifically, the engine does not accelerate during the advance periods and thus logic system 19 no longer receives an acceleration signal from Celsig simultaneously with positive current from winding 95. At this instant logic system 90 selects waveform $c$ in generator 88. Accordingly valve 80 causes piston 22 to oscillate with strokes of equal time duration with each stroke occuring for one-half second for example. From then on piston 22 oscillates at $n$ p.p.m. about the new zero position.

On the other hand, if the engine calls for retardation of the setting it will decelerate during the advance periods and accelerate during the retard periods and logic system 90 selects waveform $b$. In waveform $b$ the negative-going portion (retard) comprises three-quarters of a pulse interval and the positive going portion (advance) comprises one-quarter. In manner similar to that direction above, piston 22 will move in an advance direction one quarter second and in a retard direction for three-quarters of a second. The net effect over a series of pulses will be a retardation of the setting until the engine fails to decelerate during the advance periods and logic system 90 then selects waveform pattern $c$.

Figure 4:
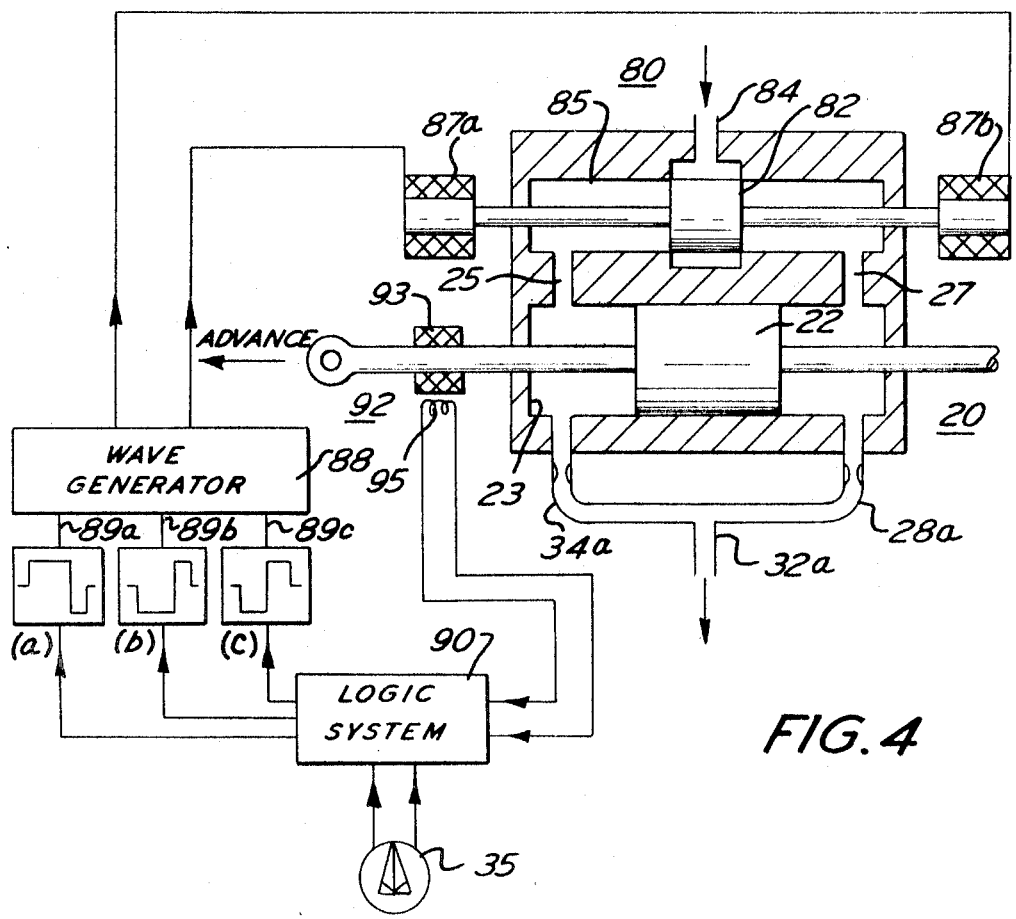
FIGS. 4 and 4A illustrate another form of the invention in which one of the valves of FIG. 1 is eliminated.

It will be understood that in the control system of FIG. 4 instead of providing an electrohydraulic valve to control the inflow of fluid, a valve may be provided to control the exit of fluid from cylinder 23. With this change the fluid supply would be directly connected to input 84 by way of lines having restrictions.

Figure 4A:
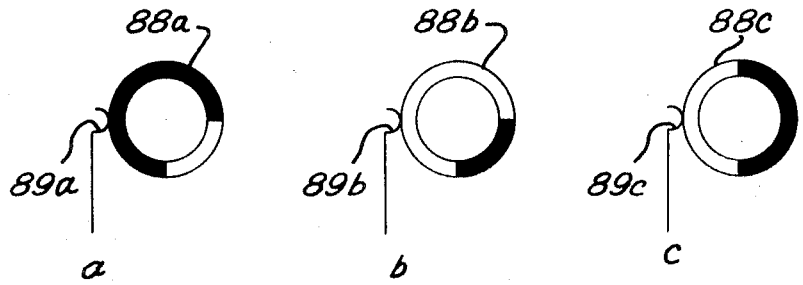

Wave generator 88 may be of the type illustrated in FIG. 4A which comprises three contact rings 88a—c engaging brushes 89a—c respectively. The contact rings are mounted on a shaft (not shown) which is rotated at a frequency of $n$ r.p.m. Each of the contact rings 88a—c comprise two segments; one conductive, the other nonconductive. In contact rings 88a the conductive part is 270° and the nonconductive segment is 90°. In contact ring 88b the conductive part is 90° and the nonconductive segment is 270°. In contact ring 88c both segments are 180°. The contact rings control the flow of current to the wave generator in such a manner that the conductive contacts produce positive voltage and the nonconductive contacts produce negative voltage. In this manner the rotating contact rings produce rectangular waves of the desired shape for solenoid actuation. Electronic pulse generators of the type well known in the art may also be used.

Figure 5:
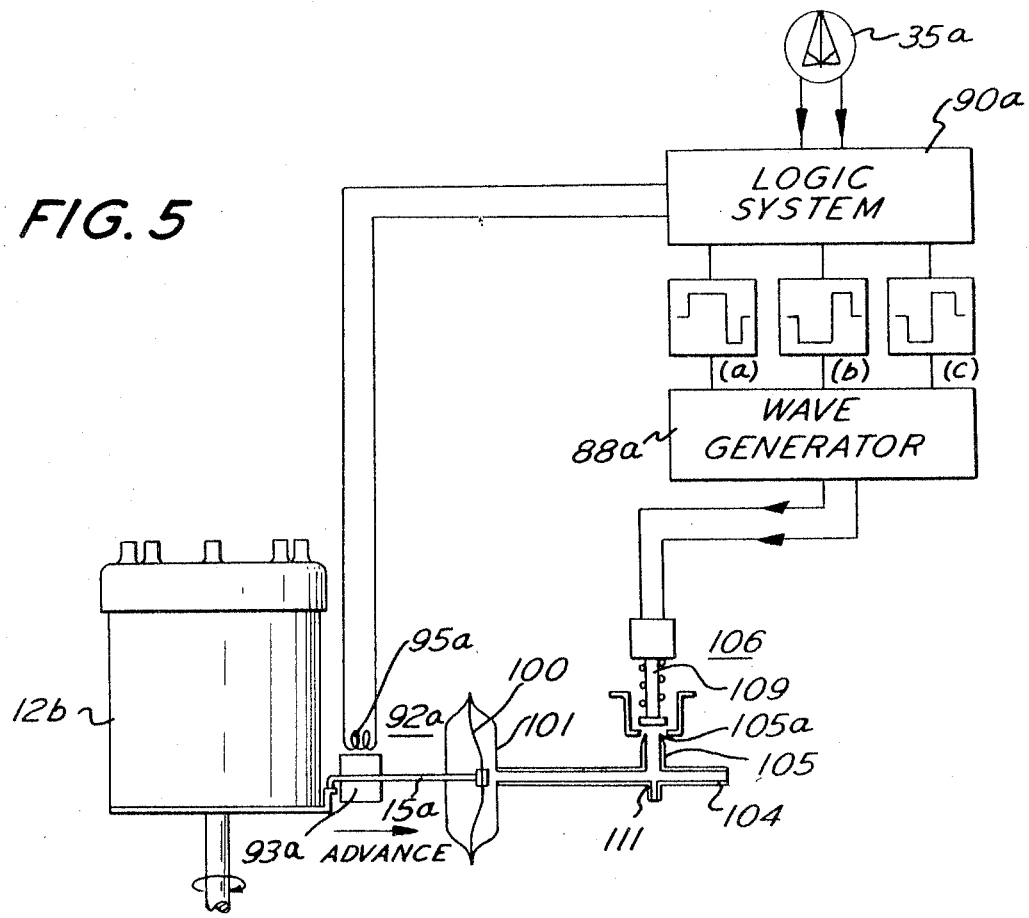
FIG. 5 illustrates still another form of the invention in which the control system of FIG. 1 uses pneumatic fluid power.

For spark timing control of internal combustion engines, especially carburetor engines, a pneumatic fluid control system may be used rather than a hydraulic fluid control system described above. In a pneumatic control system, the working fluid is air of subatmospheric pressure (intake vacuum) as produced in the intake manifold (not shown) of the engine. FIG. 5 illustrates a simple pneumatic control system in which an actuating rod 15a which adjusts the spark timing of distributor 12b is attached in a conventional manner to a diaphragm 100 within a diaphragm housing 101. Diaphragm 100 and housing 101 form an actuator operated by air pressure. The right-hand side of diaphragm housing 101 is connected by a tube 104 to the carburetor or intake manifold at a point downstream from the butterfly valve.

A side branch 105 is connected to tubing 104 with branch 105 having an opening 105a to the atmosphere which is controlled by a solenoid valve 106. When solenoid valve is energized in one direction member 109 is effective to close opening 105a. With valve 106 in the closed position, the intake vacuum through tube 104 pulls diaphragm 100 as illustrated to the right (advance) position. When valve 106 is energized in the other direction member 109 is moved upwardly thereby to open to the atmosphere. This vacuum in tube 104 is reduced and diaphragm 100 moves to the left (retard) position. A small auxiliary opening 111 insures the return of diaphragm 100 to its neutral position when the engine is not running or solenoid valve 106 is uncontrolled viz not energizing in either direction.

Solenoid valve 106 is controlled by a logic system and wave generator of the same type illustrated in FIG. 4, and similar elements have been identified with the same reference character plus a suffix. A first input to logic system 90a is provided by indicator 92a which produces a signal indicating whether actuating rod 15a is moving in the advance or retard direction. The second input to logic system 90a is applied from Celsig 35. In the manner previously described, logic system 90a selects one of the waveforms $a$, $b$ or $c$. If advance signals coincide with accelerations, waveform $a$ is selected, which is a rectangular wave negative one-quarter of the time and positive three-quarters of the time. In this manner valve 106 closes opening 105a three times longer than it is open to the atmosphere thereby to advance the timing. On the other hand of accelerations coincide with retard signals rectangular wave $b$ is selected, which is positive one-quarter of the time and negative three-quarters of the time. Accordingly, opening 105a is open to the atmosphere three times longer than it is closed, thereby to retard the timing. Thus logic system 90a is effective, step by step, to diminish the difference between the optimum setting and the actual setting until the optimum setting (best power timing) is achieved.

It will be understood that the best power timing may not be desirable. For example, in a diesel engine the optimum setting may cause engine knock and in a gasoline engine the optimum setting at idle may cause excessive amounts of unburned hydrocarbons in the exhaust. In such cases it is desirable that the optimizer circuit be disconnected and the setting be advanced or retarded by a predetermined value. Special sensors may be used to measure relevant variables such as speed, load, knock, etc. When the measured value exceeds a desired limit, the optimizer control is disconnected and a program control is effective to advance or retard the setting of the adjustable machine variable.

Figure 6:
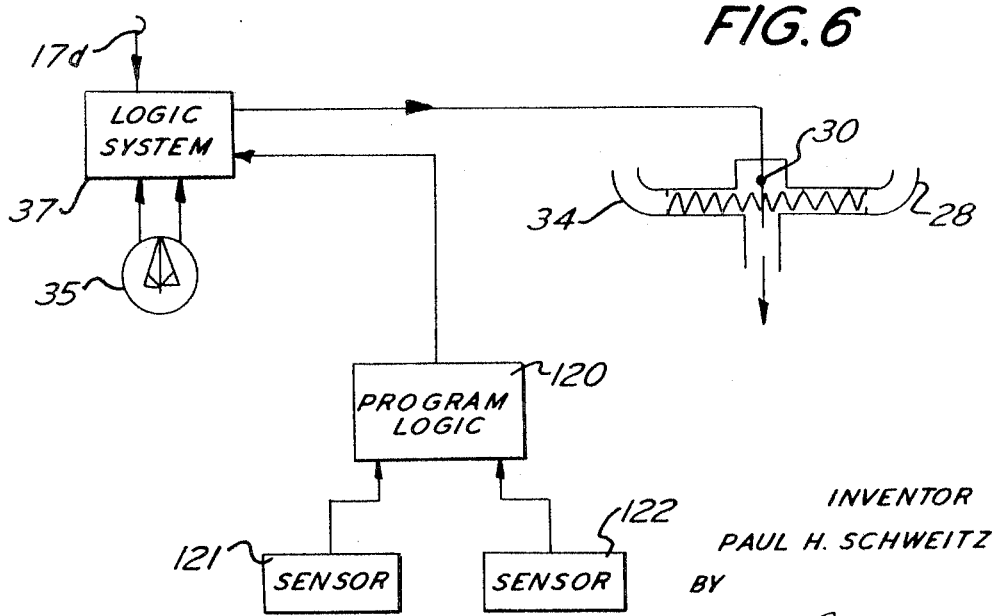
FIG. 6 illustrates still another form of the invention in which program logic is added to the system of FIG. 1.

For example, the optimizer control system of FIG. 1 may be controlled so that with a predetermined combination of low r.p.m. of the engine and a high intake vacuum, the optimizer control is disconnected and a program logic controls the setting. In FIG. 6 program logic block 120 has (1) input signals applied from sensors 121 and 122 and alternately (2) output logic signals applied to logic system 37 of FIG. 1. As previously described, input signals are applied to system 37 from brush 17d and Celsig 35. In either case the output signal is applied to control servovalve 37. Program logic 120 and logic system 37 may be combined in an integral logic system as for example a programmed general purpose digital computer. It will be understood that the remaining elements of FIG. 1 are included in the system of FIG. 6 but for simplicity have not been illustrated.

For preventing excessive amounts of unburned hydrocarbons in the exhaust, sensor 121 may be used to detect engine r.p.m. and sensor 122 may be used to detect the magnitude of the vacuum in the intake manifold. When the engine at idle for example provides a predetermined combination of low r.p.m. and high intake vacuum, program logic 120 is effective to apply a control signal to logic system 37. This control signal causes servovalve 30 to control piston 22 for a fixed retardation as for example 5° after top center. For all other conditions, of engine r.p.m. and intake manifold vacuum, program logic 120 applies a control signal allowing logic system 37 to provide optimizer control of the setting for maximum power.

Now that the principles of the invention have been explained it will be understood that many modifications may be made.

I claim:

1. A process for regulating the power output of a power producing machine to a desired operating condition, said machine having power output means and a variable of said machine that may be set to influence said power output, comprising the steps of
   a. automatically and continuously oscillating said setting cyclically about an adjustable zero position,
   b. simultaneously producing first electrical signals directly corresponding to said oscillations,
   c. sensing the positive and negative power output changes of said power output means and producing second electrical signals corresponding thereto,
   d. comparing said first and second signals at all times during each cycle of oscillation and producing a command signal in response thereto, and
   e. employing fluid pressure to adjust said zero position in response to said command signal.

2. The process according to claim 1 including the additional step of sensing at least one additional variable of said power-producing machine, and wherein said (d) step includes adjusting said zero position to a predetermined fixed value when said sensed additional variable exceeds a desired limiting value.

3. The process according to claim 22 wherein said (e) step includes applying said fluid pressure in the form of hydraulic fluid under pressure to actuator means for adjusting said zero position.

4. The process according to claim 3 wherein said (e) step includes alternately applying said fluid under pressure first to one side and then to the other side of a piston disposed within said actuator means with the time of fluid application to one of said sides being of longer duration than to the other of said sides thereby to adjust said zero position.

5. The process according to claim 3 wherein said (e) step includes alternately applying said fluid under pressure first to one side and then to the other side of a piston disposed within said actuator means with the time of fluid application being selected from one of the following in accordance with said command signal:
   1. The time of fluid application to said one side being of longer duration than to said other side,
   2. the time of fluid application to said other side being of longer duration than to said one side, or,
   3. the time of fluid application to both of said sides being of equal duration.

6. The process according to claim 1 wherein said machine is an internal combustion engine having an intake manifold and at least one cylinder in which a piston undergoes a compression stroke and a suction stroke and wherein said (d) step includes applying fluid pressure in the form of air at subatmospheric pressure as produced in said intake manifold by said suction stroke of said piston to an actuator means for adjusting said zero position.

7. The apparatus according to claim 12 wherein said machine is an internal combustion engine having an intake manifold and at least one piston which undergoes a compression stroke and a suction stroke within a cylinder in said engine and wherein said fluid is air of subatmospheric pressure produced in said intake manifold by said suction stroke and wherein valve means are provided for varying said subatmospheric pressure in accordance with said command signal.

8. A process for optimizing the power output of a power-producing machine having power output means, an adjustable variable of said machine having a setting which influences said power output comprising the steps of:
   a. continuously varying fluid pressure applied to an actuator for oscillating continuously and cyclically the setting of said machine variable about a zero position,
   b. sensing the resultant positive and negative power output changes of said power output means and producing first electrical signals corresponding thereto,
   c. producing second electrical signals corresponding to said setting variations,
   d. comparing said first and second signals continuously to produce a command signal, and
   e. controlling said fluid pressure in accordance with said command signal for adjusting said zero position to optimize said power output relative to said variable.

9. The process according to claim 8 wherein said (e) step includes controlling said fluid pressure by selecting one of the following: (1) restricting outflow from said one side, (2) restricting outflow from said other side or (3) not restricting outflow from either of said sides.

10. The process according to claim 8 including the additional step of sensing additional variables of said power-producing machine, and wherein said (e) step includes adjusting said zero position to a fixed predetermined value when each of said sensed variables exceed a respective desired limiting value.

11. The process according to claim 8 wherein said (c) step comprises producing second signals corresponding to said setting variations offset by a predetermined time duration.

12. Apparatus for optimizing the power output of a power producing machine having power output means, said machine having an adjustable variable setting which is oscillated about a zero position, said setting influencing said power output comprising
   a. actuator means upon application of fluid pressure for oscillating said setting, b. means for sensing the power output changes of said power output means and producing first electrical signals corresponding thereto,
c. means for producing second electrical signals in response to and corresponding to said oscillation of said setting,
d. means for continuously comparing said first and second signals for producing a command signal, and
e. means for applying fluid pressure to actuator means for adjusting said zero position in accordance with said command signal to optimize said power output relative to said variable.

13. The apparatus according to claim 12 wherein there is provided at least one means for sensing additional variables of said power-producing machine, logic means coupled to said fluid pressure-applying means for adjusting said zero position of said setting to a predetermined fixed value in response to at least one of said sensed variables changing beyond a desired limiting value.

14. The apparatus according to claim 12 wherein said fluid pressure-applying means includes dither valve means coupled to said actuator means for alternately applying fluid under pressure first to one side and then to the other side of a piston disposed within said actuator means with the time of fluid application being selected from one of the following in accordance with said command signal:
1. the time of fluid application to said one side being of longer duration than to said other side,
2. the time of fluid application to said other side being of longer duration than to said one side, or
3. the time of fluid application to both of said sides being of equal duration.

15. The apparatus according to claim 14 wherein said dither valve means comprises an electrohydraulic valve responsive to input signals and in which there is provided generator means for applying input signals to said electrohydraulic valve in accordance with said command signal.

16. Apparatus for optimizing the power output of a power-producing machine having power output means, said machine having an adjustable variable whose setting influences said power output comprising
a. actuator means having a piston disposed therein for controlling the setting of said machine variable,
b. valve means coupled to said actuator means for applying fluid under pressure alternately first to one side and then to the other side of said piston for oscillating said setting about a zero position.
c. means for sensing the positive and negative power output changes of said power output means for producing first signals corresponding thereto,
d. means for producing second signals corresponding to said oscillations of said setting,
e. means for comparing said first and second signals to produce a command signal, and
f. means for controlling the outflow of fluid from said actuator means for varying the fluid pressure on said sides of said piston in accordance with said command signal for adjusting said zero position thereby to optimize said power output relative to said variable.

17. The apparatus according to claim 16 wherein there is provided means for applying fluid under pressure alternately first to one side and then to the other side of said piston and wherein said controlling means comprises a valve operable in accordance with said command signal to one of the following positions: (1) restricting outflow from said one side, (2) restricting outflow from said other side or (3) not restricting outflow from either of said sides.

18. The apparatus according to claim 16 wherein said second signal producing means produces second signals corresponding to said setting oscillations offset by a predetermined time duration.

19. A process for regulating the power output of a power-producing machine having power output means, an adjustable variable of said machine having a setting which influences said power output, comprising the steps of:
a. continuously applying fluid under pressure alternately, first to one side then to the other side of a piston in an actuator for oscillating the setting of said machine variable about a zero position,
b. sensing the resultant positive and negative power output changes of said power output means and producing first signals corresponding thereto,
c. producing second signals corresponding to said setting variations,
d. comparing said first and second signals to produce a command signal, and
e. controlling said fluid pressure in accordance with said command signal for adjusting said zero position to achieve a predetermined position of said power output relative to said variable, said controlling step including the outflow of fluid from said sides of said piston in accordance with said command signal.